United States Patent Office 3,306,782
Patented Feb. 28, 1967

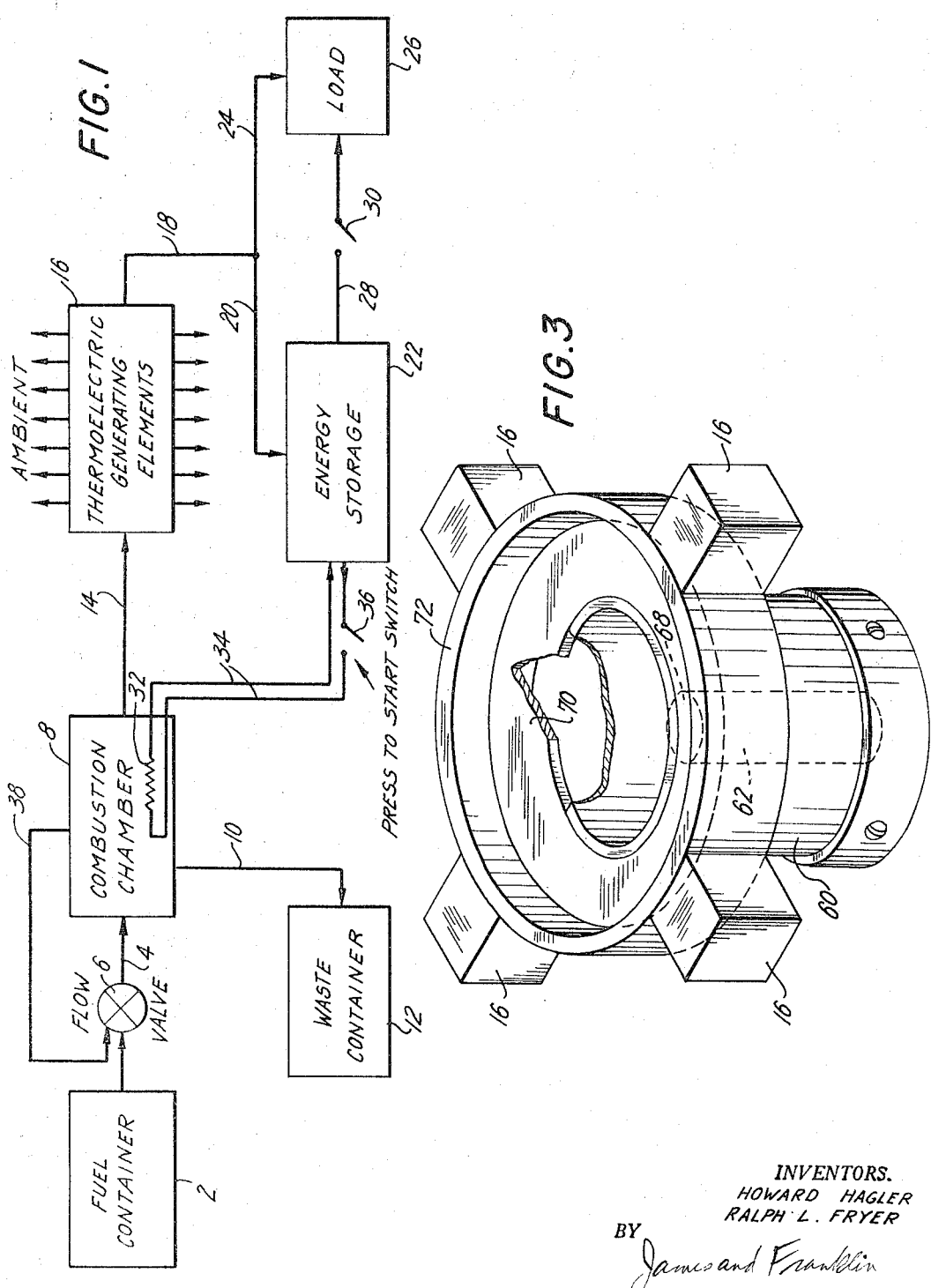

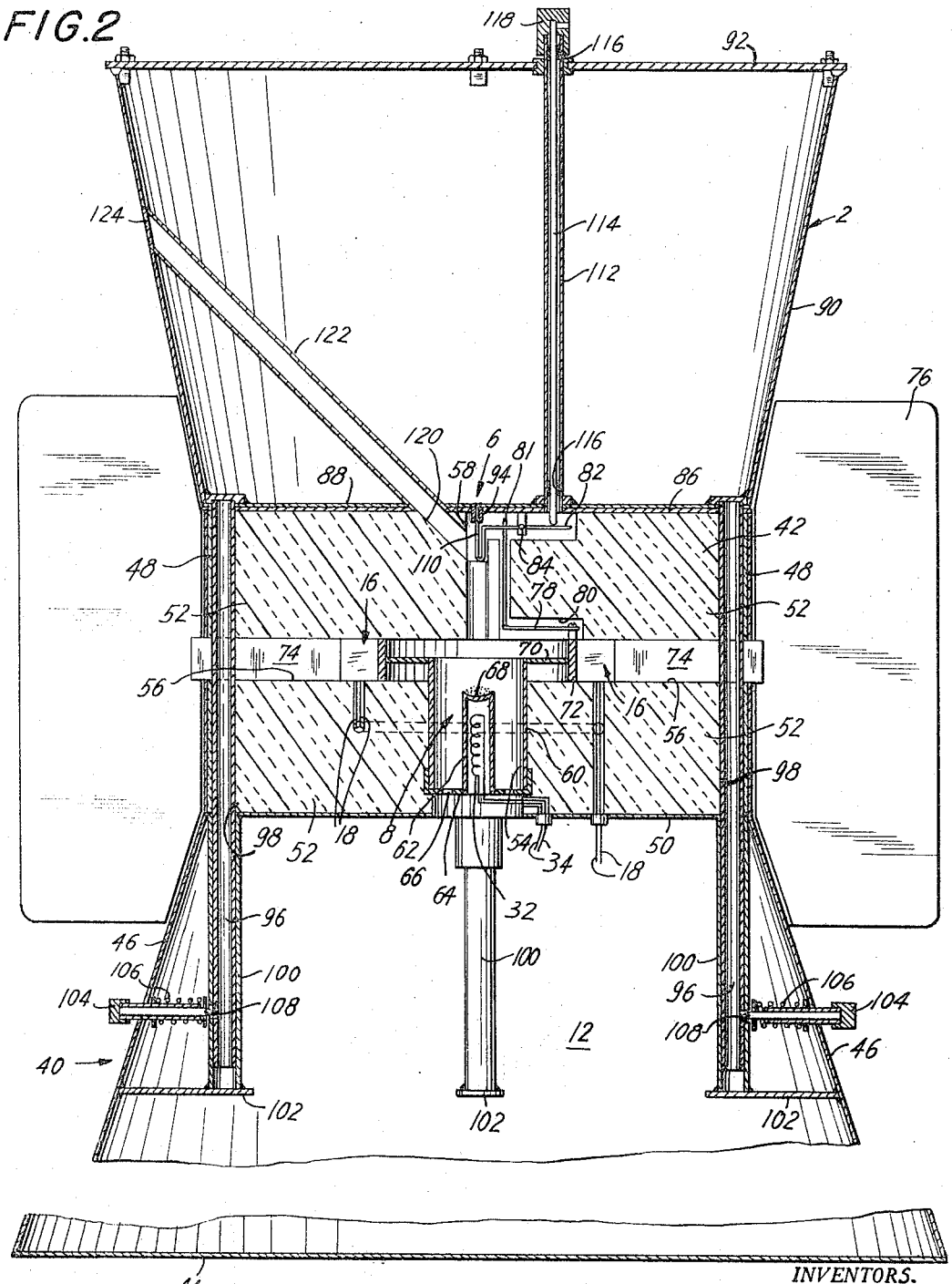

3,306,782
CHEMICALLY FUELED THERMO-ELECTRIC GENERATOR ASSEMBLY
Howard Hagler, Westfield, and Ralph L. Fryer, East Orange, N.J., assignors to General Instrument Corporation, Newark, N.J., a corporation of New Jersey
Filed Feb. 23, 1961, Ser. No. 91,070
8 Claims. (Cl. 136—208)

The present invention relates to the construction and arrangement of a chemically fueled thermoelectric generator assembly, and in particular to one adapted to be independent of an external air supply and to produce products of combustion which are entirely or substantially non-gaseous.

There are many applications where an entirely self-contained electricity-generating means is desired, and in many instances the environment is such as to require that the generation of electricity be accomplished in the absence of air or oxygen. For example, it may be desired to anchor an electrical installation beneath the surface of the sea and to have that installation function reliably over exceedingly long periods of time. Charged electricity storage devices would not alone provide the necessary power for such extended operation without making the device so heavy, bulky and expensive as to render it impractical. Underwater installations of the type under discussion are often installed secretly, and hence they must function in such a way as not to betray their location. In installations of this type it is necessary, therefore, that means be provided for generating electricity over a long period of time, that the electricity-generating means be capable of functioning in the absence of air, and that it not produce any gaseous products of combustion, since the latter, when escaping from the apparatus, as they must if the internal pressure is not to become excessive, would form bubbles in the water and thus disclosed the existence and location of the installation.

The apparatus of the present invention constitutes an electrical power source that has a wide range of power capability and is at the same time adaptable to many types of underwater environments and missions. In its preferred form, as here specifically disclosed, it uses as fuel a chemical compound which burns to produce heat, and the products of combustion thereof are entirely solid in nature.

The heat produced by the combustion of the fuel is active upon thermoelectric generating elements of known construction and composition in order to generate electricity. The electricity may either be used as it is generated or may be used to charge a conventional electricity storage device from which the electricity may be drawn when needed. The entire apparatus may be designed to operate entirely under the influence of gravity flow, thereby making for an exceptionally simple, reliable and inexpensive assembly with a minimum of moving parts. Indeed, the only moving part required is a simple valve element which controls the flow of fuel.

Automatic means is preferably incorporated into the assembly in order to control the rate of flow of fuel, and hence the production of heat. This automatic means may be actuated in response to the amount of heat produced in order to maintain the heat supplied to the thermoelectric generating elements within desired operating limits.

The apparatus of the present invention is characterized by having exceedingly high reliability because there are substantially no moving parts. It is not dependent upon an air supply because the fuel which it uses may be entirely chemically self-contained. When the products of combustion of that fuel are entirely non-gaseous in character, the apparatus may be entirely self-contained and sealed, and will not disclose its existence or location even if used in underwater applications. It can operate under wide environmental fluctuations, and will be capable of operating for extended periods of time, on the order of months. Its total weight, including the weight of the fuel required for producing a power output on the order of two watts continuously for such extended periods of time, may be as little as fifty pounds, thus making it exceptionally adaptable for many different applications.

While this general description has emphasized the suitability of the disclosed apparatus for underwater applications, it will be understood that its utility is not limited thereto. It may be used, for example, in outer space applications, where air is not available, and is also of general utility even where the absence of air and the undesirability of gaseous products of combustion are not significant factors.

In accordance with the present invention the heat-producing portion of the apparatus comprises a supply of fuel, means for controlling the flow of fuel to a combustion station where the fuel is burned, and means for receiving and holding the products of combustion. Thermoelectric generating elements of appropriate construction and composition are placed in thermal communication with the combustion chamber so as to be energized by the heat produced in that chamber when the fuel burns, thereby to produce electricity which may be used or stored in any conventional manner. Means may be provided for causing the fuel to begin to burn; once combustion has started the heat produced by that combustion will be sufficient to cause combustion to continue so long as fuel is supplied to the combustion station. The entire flow of material—fuel flowing from a fuel container to the combustion station and combustion products flowing from the combustion chamber to the storage space for the combustion products—is preferably exclusively gravity-powered.

To the accomplishment of the above, and to such other objects as may hereinafter appear, the present invention relates to the construction and arrangement of a chemically fueled thermoelectric generator as defined in the appended claims and as described in this specification, taken together with the accompanying drawings, in which:

FIG. 1 is a block diagram of an overall installation;

FIG. 2 is a cross sectional view of a preferred embodiment of the generator assembly; and FIG. 3 is a three-quarter perspective view, partially broken away, of a component of the assembly comprising the combustion chamber and the thermoelectric generating elements.

Having reference first to the block diagram of FIG. 1, which discloses in schematic form the basic elements of the apparatus and the system with which it is used, a container 2 for the fuel to be employed is connected by means of passage 4 and flow valve 6 with a combustion chamber 8, where the fuel is adapted to be burned to produce heat. A passage 10 communicates between the combustion chamber 8 and a waste container 12, the latter being adapted to hold and store the products of combustion. The heat produced in the combustion chamber 8 is transmitted, as indicated by the line 14, to one or more thermoelectric generating elements 16, the elements 16 also being operatively connected in a thermally dissipating manner to the ambient environment. The electricity generated by the elements 16 may be conveyed, as indicated by lines 18 and 20, to an electricity storage device 22 or, as indicated by lines 18 and 24, directly to an electrically energized load device 26. The load device 26 may also be energized from the storage device 22 via line 28 and switch 30. In order to initiate combustion, a heating device 32 may be provided in the combustion chamber 8. That device may take the form of an electrically heated element connected by leads 34 and switch 36 to the storage device 22.

When the system of FIG. 1 is to be put into operation the switch 36 is closed, thus energizing the heating device 32 and raising the temperature of an appropriate element in the combustion chamber 8 to a value such as to cause combustion of the fuel to start. The valve 6 is opened, and fuel is caused to enter the combustion chamber 8, where it burns. The heat of combustion not only energizes the thermoelectric generating elements 16 but also maintains the temperature within the combustion chamber 8 at a value such that combustion will continue, thereby rendering unnecessary any continued energization of the heating means 32. Accordingly the switch 36 is opened, and no further electrical drain from the storage device 22 takes place.

As indicated by the line 38, the temperature in the combustion chamber 8 may be caused to control the setting of the valve 6, and hence the rate at which fuel enters the combustion chamber 8, thereby to maintain the temperature within the combustion chamber 8 at a value appropriate to the proper energization of the thermoelectric generating elements 16.

Turning now to FIGS. 2 and 3, which discloses a preferred embodiment of the thermoelectric generating assembly, that assembly comprises a base 40, a body 42 mounted thereon which contains the combustion chamber 8 and the thermoelectric generating elements 16, and a fuel container 2 which may be removably mounted upon the body 42. The body 42 is mounted on top of the base 40 and the fuel container 2 is mounted on top of the body 42, thereby to provide for gravity feed and flow throughout the apparatus.

The base 40 is hollow, and comprises a bottom wall 44, inwardly tapering side wall portions 46, and upper vertical side wall portions 48. The body 42 is mounted and supported between the upper vertical side wall portions 48 on laterally extending inner wall 50. It comprises masses of suitable heat insulating material 52 having a central lower opening 54, laterally oriented openings 56 extending therefrom, and an upper opening 58 extending therefrom.

The subassembly disclosed in FIG. 3 is mounted in the opening 54 and partially in the openings 56. That subassembly comprises radially spaced outer and inner shells 60 and 62 connected by a bottom wall 64 provided with apertures 66, the upper surface 68 of the inner shell 62 being concave, located below the upper edge of the outer shell 60 and beneath the opening 58. The electrically heated element 32 may be mounted inside the inner shell 62, which may be open at its bottom. The outer shell 60 is provided with an outwardly extending flange 70 having a rim 72. The shells 60 and 62, the flange 70 and the rim 62 may be formed of any suitable structural material, such as stainless steel.

The thermoelectric generating elements 16 may be of any appropriate construction and composition. Bismuth telluride alloys are advantageously employed. The "hot" sides of the elements 16 are directed against the rim 72; indeed, the elements 16 may be physically secured to the rim 72 in that position. The elements 16 are received within the outwardly extending lateral passages 56 in the body 42, and their "cold" sides (the side directed away from the rim 72), engage with heat-conducting members such as aluminum blocks 74 which extend through appropriate apertures in the side walls 48 to the exterior of the device, where they may be connected to heat-dissipating fins 76. Electrical connections to the thermoelectric generating elements 16 may be made by the wires 18 which pass through appropriately located passages and openings in the body 42.

A heat-sensing element, such as the bimetallic bar 78, is in thermal communication with the combustion chamber 8, as by being mounted upon the rim 72 and received within space 80 formed in the heat insulating material 42. The free end of the bimetallic bar 78 is connected by means of rod 81 to a lever 82 pivotally mounted at 84 on the top wall 86 of the housing 40, so that bending of the bimetallic strip 78, when it is free to bend, will cause pivotal movement of the lever 82, for a purpose to be described hereinafter.

The fuel container 2 comprises a casing having a bottom wall 88, side walls 90 and a top wall 92. An apertured fitting 94 is carried by the bottom wall 88 and communicates with the interior of the container 2. The container 2 is further provided with a plurality of downwardly extending legs 96 which are adapted to slide through passages 98 in the body 42 and be telescopingly received within tubes 100 carried by the base 40 and supported on ledges 102 extending inwardly from the side walls 46 thereof, thus permitting the mounting and demounting of the fuel container 2 on the body 42 and base 40. Plungers 104 are accessible at the exterior of the base 40 and are urged inwardly by means of springs 106, the stips of the plungers 104 passing through apertures 108 in the tubes 100 and legs 96 so as to detachably secure the fuel container 2 in place.

When the fuel container 2 is in place the apertured fitting 94 will be positioned immediately above the passage 58 and the concave wall 68 at the top of the inner shell 62. The upbent tip 110 of the lever 82 will enter the lower end of the aperture in the fitting 94, thereby to function as the flow valve 6. Passing vertically through the fuel container 2 is a tube 112 within which rod 114 is slidable, the lower end of the rod 114 engaging the right hand end of the lever 82. The rod 114 is sealed within the tube 112 by sealing elements 116, and its vertical position is controllable through adjustment of the head 118 which is externally accessible and is threadedly or otherwise appropriately engaged with the upper end of the tube 112. When the rod 114 is moved downwardly, as shown in FIG. 2, it will positively urge the lever 82 to pivot in a clockwise direction, thus blocking the aperture through the fitting 94 and preventing the escape of fuel from the container 2.

If it is desired to observe what goes on with the combustion chamber 8, a sighting passage 120 may be provided in the body 42 which communicates with a registering sighting tube 122 passing through the container 2 and terminating, at the exterior of the container, in a sealed glass window 124.

Where it is desired that the operation of the assembly here disclosed be independent of the presence of air or oxygen and where it is desired that the products of combustion of the fuel be entirely non-gaseous in nature, chemically self-contained fuel having combustion products of the desired character may be employed. One such fuel is a suspension of powdered lithium metal in a fluorocarbon oil such as that sold under the trade name "Kel-F." When a fuel of this nature burns its products of combustion are entirely solid, and consist of carbon and lithium halide. Another satisfactory fuel is a suspension of an alloy of lithium, magnesium and aluminum in such a fluorocarbon oil, the metal content being predominantly aluminum. In this latter case the products of combustion include halides of magnesium and aluminum as well as of lithium. Fuels of this type will burn when raised to temperatures of 550° F.–600° F.

When the device of the present invention is to be used the fuel container 2 is mounted on the body 42, the action of the rod 114 on the valve lever 82 preventing any escape of fuel therefrom. When it is desired that the generation of electricity be commenced the switch 36 is closed, thus energizing the coil 32, which heats the shell 62 inside the combustion chamber 8 to the appropriate ignition temperature for the fuel. When that temperature has been attained the valve 114 is lifted, as by unscrewing or lifting the head 118, and the valve lever 82 pivots in a counter-clockwise direction under the influence of cool bimetallic strip 78, thereby unblocking the aperture in the fitting 94 and permitting drops of fuel to fall from that fitting through the passage 58 onto the concave upper surface 68 of the shell 62. There the drops of fuel form a puddle and the fuel burns, producing heat. The solid combustion products float to the top of the puddle and fall past the sides thereof to the bottom shell wall 64, the combustion products then falling through the apertures 66 in the wall 64 into the hollow interior of the lower part of the base 40. Of course, it will be understood that the combustion chamber 8 itself could be made large enough so as to itself function as a waste container. The rate at which the fuel will drip onto the puddle formed on the dished wall 68 will be automatically controlled by the bimetallic strip 78 so as to maintain the temperature within the combustion chamber at a desired value. The heat of the combustion chamber will be transmitted by the flange 70 and 72 to the hot sides of the thermoelectric generating elements 16, thereby causing them to generate electricity in accordance with known principles, and that electricity is fed either to the load device 26 or to the storage device 22, which latter may be constituted by a nickel-cadmium battery.

A device of the character described can produce 2 watts of electrical power having a two-volt output for a period of time limited only by the amount of fuel available. An assembly having an overall weight of 50 pounds, including fuel, can continue to generate electricity at the rate indicated for a period of thirty days.

Where, as is here disclosed, the assembly is designed to operate on a gravity flow principle from the fuel in the container 2 through the combustion chamber 8 to the waste container 12, the base 40 may be weighted in any appropriate manner in order to ensure that the device will assume an upright condition. Where the apparatus is to be used under cool ambient conditions, as where it is to be located beneath the surface of the sea, sufficient heat dissipation will probably be achieved merely from the exposed ends of the aluminum heat-transmissive blocks 74, so that the fins 76 can be eliminated. The fins 76 will, however, be highly desirable where the device is operated in air at normal temperatures.

Where, as is here specifically disclosed, the fuel container 2 is removably mounted on the body 42, suitable sealing means will be provided on joints or seams in order to prevent the entry of water into the combustion chamber 8.

It will be seen from the above description that the apparatus of the present invention is exceptionally effective for its designed purposes, may be made entirely independent of its environment, and will not produce any combustion products which need escape from the apparatus. Because it has virtually no moving parts it is exceptionally reliable in operation. Its efficiency is well within operating limits. Its operating life is determined only by the amount of fuel which is supplied to it. It is inexpensive and sturdy, and capable of use in a wide variety of applications and under wide environmental fluctuations.

While but a single specific embodiment of the present invention has been here disclosed, it will be apparent that many variations may be made therein, all within the scope of the invention as defined in the following claims.

We claim:

1. A thermoelectric generator assembly comprising a base having a closed inner space therein, a heat-insulated body mounted on said base and having an inner combustion chamber, a plurality of thermoelectric generating devices in said body in thermal communication with said chamber, heat-transmissive elements extending from said generating devices to the exterior of said body, a member in said chamber for receiving and supporting fuel thereon, a fuel storage container mounted on said body in gravity feed relation to said member, said body having a fuel passage communicating between said fuel storage container and said chamber, means for controlling the flow of fuel from said fuel contianer to said member, said assembly having a second passage between said inner space and said chamber through which the combustion products of said fuel are adapted to pass, said chamber, said second passage and said inner space being in gravity feed relation.

2. A thermoelectric generator assembly comprising a fuel storage container, means defining a combustion station therebelow and spaced therefrom, a waste container below said combustion station, a first passage including a valve between said fuel storage container and said combustion station, a second passage extending from said combustion station to said waste container, and a thermoelectric generating device one side of which is in thermal communication with said combustion station and the other side of which is in thermal communication with heat dissipating means, the flow of fuel from said fuel storage container to said combustion station and the flow of combustion products from said combustion station to said waste container being substantially impelled by gravity, and a heat-sensitive element in thermal communication with said combustion station and operatively connected to said valve to control the latter.

3. A thermoelectric generator assembly comprising a fuel storage container, means including an open-topped fuel-receiving-and-supporting member defining a combustion station therebelow and spaced therefrom, a waste container below said combustion station, a first passage including a valve between said fuel storage container and said combustion station, a second passage extending from said combustion station to said waste container, and a thermoelectric generating device one side of which is in thermal communication with said combustion station and the other side of which is in thermal communication with heat dissipating means, the flow of fuel storage from said fuel container to said combustion station and the flow of combustion products from said combustion station to said waste container being substantially impelled by gravity, said open-topped fuel-receiving and -supporting member is disposed beneath said first passage and is enclosed within a housing spaced laterally therefrom, the space between said member and said housing defining in part said second passage through which the products of combustion are adapted to pass, and, in combination therewith, means for heating said fuel-receiving and -supporting member to initiate combustion of fuel, and a heat-sensitive element in thermal communication with said combustion station and operatively connected to said valve to control the latter.

4. In the assembly of claim 1, a heat-sensitive element in thermal communication with said chamber, and an operative connection between said heat-sensitive element and said means for controlling the flow of fuel, whereby the latter is actuated by the former.

5. The assembly of claim 1, in which said means for controlling the flow of fuel comprises an apertured part in communication with said fuel storage container, a movable valve member operatively associated with said apertured part, and manual means operatively connected to said valve member for controlling the latter.

6. The assembly of claim 5, in which said fuel storage container is separable from said body, said apertured part is carried by said fuel storage container and said valve member is carried by said body.

7. The assembly of claim 1, in which said means for controlling the flow of fuel comprises an apertured part in communication with said fuel storage container, a movable valve member operatively associated with said apertured part, and manual means operatively connected to said valve member for controlling the latter, a heat-sensitive element in thermal communicaiton with said chamber, and an operative connection between said heat-sensitive element and said valve member for actuating the latter.

8. The assembly of claim 7, in which said fuel storage container is separable from said body, said apertured part is carried by said fuel storage container, and said valve member and said heat-sensitive element, together with the operative connection therebetween, are carried by said body.

References Cited by the Examiner

UNITED STATES PATENTS

| | | | | |
|---|---|---|---|---|
| 1,506,322 | 8/1924 | O'Neill | | 110—1 |
| 1,506,323 | 8/1924 | O'Neill | | 110—1 |
| 1,532,930 | 4/1925 | O'Neill | | 110—1 |
| 2,289,682 | 10/1939 | Rasor. | | |
| 2,410,872 | 11/1946 | Findley | | 136—4 |
| 2,415,005 | 1/1947 | Findley | | 136—4 |
| 2,480,404 | 8/1949 | Findley et al. | | 136—4 |
| 2,520,679 | 8/1950 | Findley | | 136—4 |

WINSTON A. DOUGLAS, *Primary Examiner.*

JOHN H. MACK, *Examiner.*

J. H. BARNEY, A. M. BEKELMAN,
              *Assistant Examiners.*